(No Model.)
L. KOHNS.
CUP FOR RECEIVING CONDENSED MILK OR MARMALADE PACKAGES.
No. 406,841. Patented July 9, 1889.
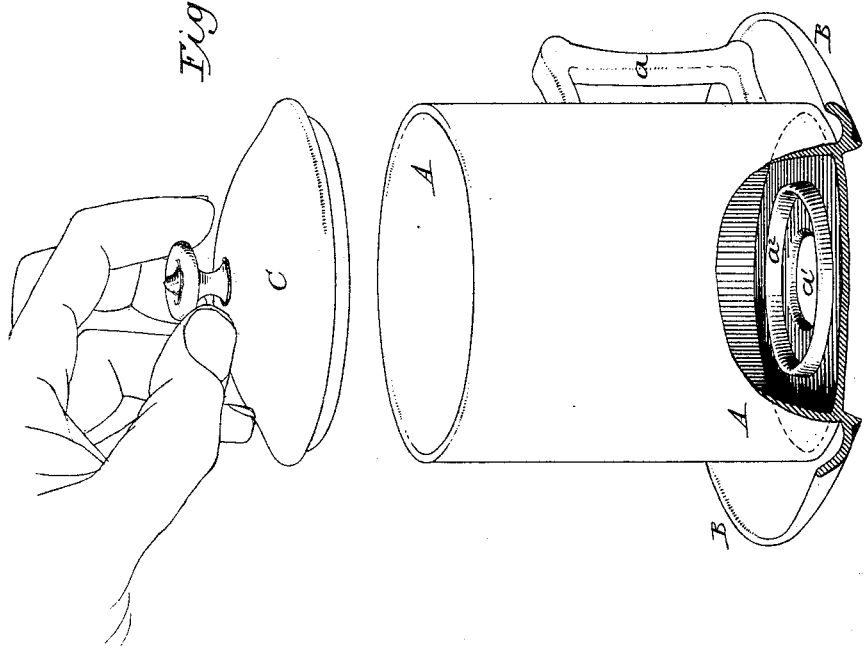
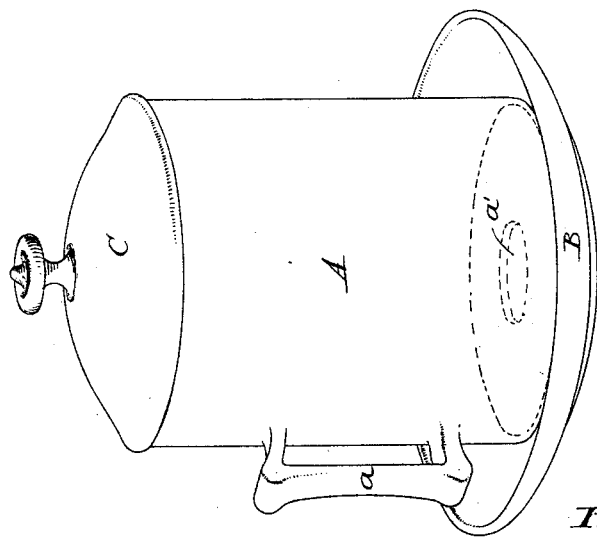

UNITED STATES PATENT OFFICE.

LAZARUS KOHNS, OF NEW YORK, N. Y.

CUP FOR RECEIVING CONDENSED-MILK OR MARMALADE PACKAGES.

SPECIFICATION forming part of Letters Patent No. 406,841, dated July 9, 1889.

Application filed September 20, 1888. Serial No. 285,890. (No model.)

*To all whom it may concern:*

Be it known that I, LAZARUS KOHNS, of New York, in the county of New York and State of New York, have invented new and useful Improvements in Cups for Receiving Condensed-Milk or Marmalade Packages; and I do hereby declare the following to be a full, clear, and exact description of said invention, reference being had to the accompanying drawings, and to the letters or figures of reference marked thereon, which form a part of this specification.

My invention relates to improvements in cups designed to contain condensed-milk cans or jars, as well as marmalade cans or pots, and for use on the table, and my object is to provide a useful article for the table and which will serve to contain and conceal the usual unsightly can, jar, or pot in which condensed milk or marmalade is supplied.

My invention consists in the article and construction thereof, as hereinafter described, and pointed out in the claims.

Canned and fresh condensed milk is largely used on the table in this country, and the former is generally supplied in tin cans or jars and the latter in tumblers. Heretofore both kinds when used on the table were not as pleasing to the eye as they may be to the palate, as the jar or tin can always has an unclean appearance caused by the drippings hanging to the sides of the jar or can, and by the ragged appearance of the edge of the tin cover, &c.; and, furthermore, the contents of such jar or can are exposed to the ravages of flies and other insects. It will not do to empty the milk into a pitcher, as it is not liquid enough to allow this without losing some of it. Many of these disadvantages in the use of condensed milk are also incidental in the use of marmalade as supplied in pots or cans. I overcome these disadvantages by the invention illustrated in the accompanying drawings, in which—

Figure 1 is a perspective view of my cup or receptacle, and Fig. 2 is a similar view with a portion of the side of the cup broken out to show a modification.

At A is shown the cup proper, having a handle $a$ and having at or near its bottom a flange B, similar to the rim of a saucer. C represents the cover of the cup, and this cover may, if desired, be provided with a slot in one edge to receive the handle of a spoon resting in the cup, as is common in mustard-cups. The bottom of the cup is provided with an opening $a'$, to allow the passage of a finger to facilitate the removal of a milk-can from the cup, as a can, the sides of which generally become quickly smeared with milk, cannot be easily lifted out by its top alone. This opening $a'$ is shown in dotted lines in Fig. 1 and in full lines in Fig. 2. The flange B is to prevent drippings from getting on the table.

Since drippings might find their way down the sides of the can or jars inside the cup, and thence through the opening $a'$ to the table, I may sometimes provide the bottom of the cup with a rim surrounding the opening, as shown at $a^2$ in Fig. 2. This rim may be quite close to the edge of the opening $a'$, or it may be, as shown, located at some distance from it, so as to provide a better bearing for the bottom of the can or jar.

In the use of my invention the package—viz., the can, jar, pot, or tumbler—containing the condensed-milk or marmalade having been opened is placed in the cup or receptacle, covered up, and the whole placed on the table, thus presenting an ornamental appearance instead of, as heretofore, an unsightly one. The milk or marmalade can then be dipped out by a spoon by whomsoever wishes to use it.

To remove the can, jar, pot, or tumbler from the cup, it is only necessary to insert a finger through the opening $a'$ from below, and to thus lift said can until its upper edge projects above the top of the cup, when said upper edge can then be grasped to remove the can entirely.

The cup may be made of china, earthenware, glass, tin, silver, or any other suitable material.

Having thus described my invention, what I claim, and desire to secure by Letters Patent, is—

1. As a new article of manufacture, a cup for receiving condensed-milk or marmalade packages, having an opening in its bottom and an integral flange projecting outwardly therefrom near its bottom, substantially as described.

2. A cup or receptacle having an opening in its bottom, an upwardly-projecting rim surrounding said opening, and an integral flange projecting outwardly from said cup near its bottom, substantially as described.

In testimony whereof I affix my signature in presence of two subscribing witnesses.

LAZARUS KOHNS.

Witnesses:
H. SIEGEL,
CHAS. G. SILVERBERG.